(No Model.)  2 Sheets—Sheet 1.

J. W. MOTE.
EVAPORATOR.

No. 552,667.  Patented Jan. 7, 1896.

Witnesses:

Inventor:
Jeremiah W. Mote
By Dewey & Co.
Attys

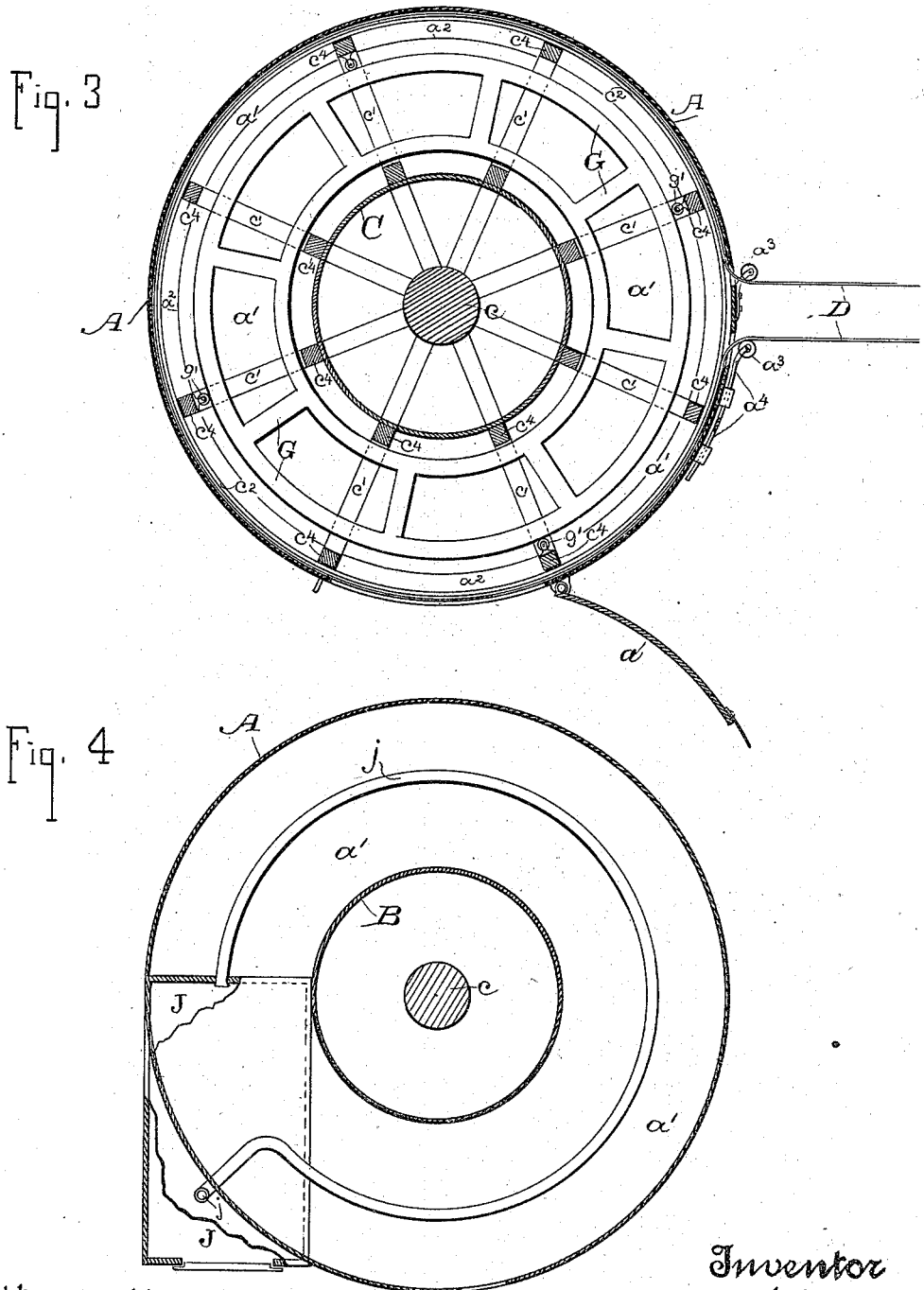

UNITED STATES PATENT OFFICE.

JEREMIAH WELLINGTON MOTE, OF WILBUR, OREGON.

EVAPORATOR.

SPECIFICATION forming part of Letters Patent No. 552,667, dated January 7, 1896.

Application filed May 13, 1895. Serial No. 549,173. (No model.)

*To all whom it may concern:*

Be it known that I, JEREMIAH WELLINGTON MOTE, a citizen of the United States, residing at Wilbur, county of Douglas, State of Oregon, have invented an Improvement in Evaporators; and I hereby declare the following to be a full, clear, and exact description of the same.

My invention relates to that class of fruit evaporators or driers in which the trays of fruit are kept in constant motion; and my invention consists in an evaporator having an annular space the lower portion of which is a heating-chamber, and in the upper portion is a rotatable frame carrying one or more independently-rotatable tray-carriers, all of which, together with details of construction and arrangement, I shall hereinafter fully describe and claim.

The general object of my invention is to effect a perfect distribution of the heat and an even exposure of the fruit to the heat, so that the drying shall be equable throughout the entire charge.

Figure 1:
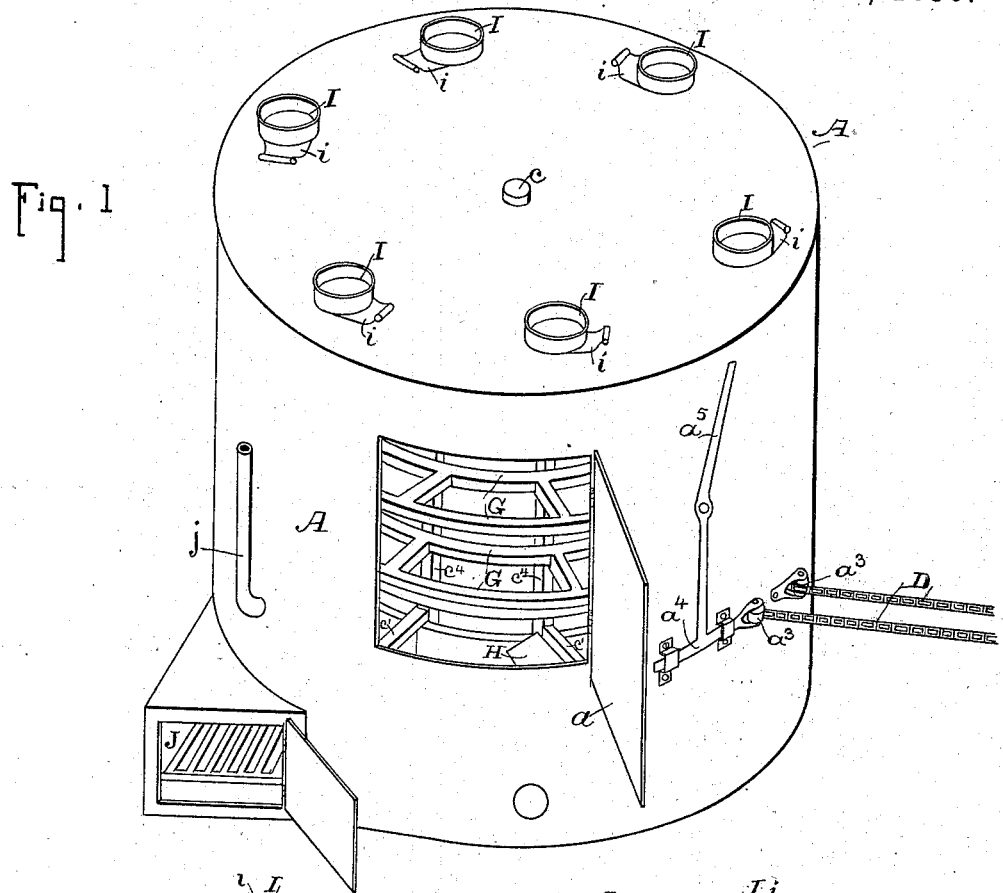
Figure 2:
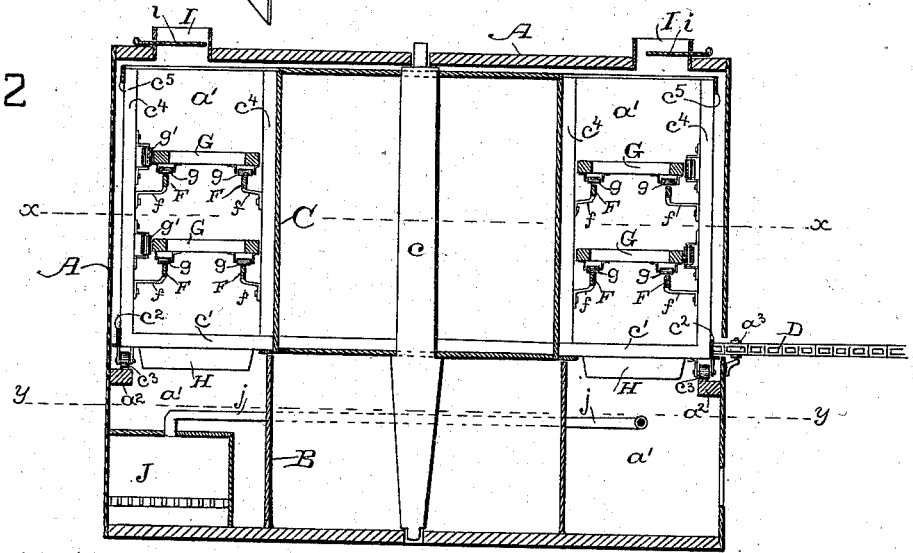

Referring to the accompanying drawings for a more complete explanation of my invention, Figure 1 is a perspective view of my evaporator. Fig. 2 is a vertical section of same. Fig. 3 is a horizontal section on line $x\ x$ of Fig. 2. Fig. 4 is a horizontal section on line $y\ y$ of Fig. 2.

A is the outer wall or shell of the evaporator. It is made circular and is closed at top and bottom, and is provided with a door $a$ by which access is had to the interior.

Within and concentric with the outer wall or shell is an inner core B, which with the rotatable drum C of the tray-carrying frame forms an inner wall and leaves an annular chamber (designated by $a'$) within the outer shell.

The rotatable drum C has for its axis a vertical shaft $c$, which is suitably journaled in the top and bottom of the shell A, and from which radiate arms $c'$ which extend out to a ring $c^2$, under which are carrying rollers or wheels $c^3$ traveling on a track $a^2$ fixed within the shell A. Rising from these arms $c'$ are frames $c^4$ bounded at their top by an annular band $c^5$, the whole forming a skeleton reel on the outside of and rotating with the drum C.

Rotation may be imparted to this drum and reel by any suitable means, and I have here shown for this purpose an endless chain or belt D passing around the ring $c^2$ and out past suitable guide-rollers $a^3$ on the shell to a power device unnecessary herein to show. This belt or chain may be thrown into and out of gear or action by means of a suitable tightener, here shown as being one of the guide-rollers $a^3$, which is mounted upon a sliding bar $a^4$ and is operated by a pivoted lever $a^5$.

Supported by suitable brackets $f$ from the frames $c^4$ of the reel are circular tracks F, and upon these are mounted by means of wheels $g$ the tray-carriers G. There may be one or more of these carriers mounted in vertical series or tiers, each upon its own set of tracks and each independent of the other and independently rotatable or adjustable. I have here shown two such tray-carriers. Each of these carriers may be divided into any number of sections adapted to receive a number of trays, the trays being placed upon them through the door $a$ of the shell. These tray-carriers are circular in shape and are guided in their movement by any means of antifriction wheels or rollers $g'$ on the outside frame-bars of the reel.

Extending downwardly from the radial arms $c'$ of the drum C are blades or fans H, adapted to agitate and keep in motion the heated air.

Ventilators I are made in the top of the shell A and are controlled by suitable dampers $i$.

At the lower portion of the shell is the furnace J, extending within the lower portion of the annular heating-space and having a pipe $j$ for the products of combustion, said pipe extending around in the circular lower portion of the chamber and out through the shell, as shown.

As before stated, the trays of fruit are placed upon the carriers through the open door of the shell. As each tray-carrier rotates easily and independently, it is very convenient to place the trays of fruit on each and upon each section thereof. It is also convenient to take them off, as every tray is very easily brought to the door, as each tray-carrier is rotated by hand, and in placing the fruit each tray is put upon its proper section by merely rotating the tray-carrier.

All the trays and all the tray-carriers are rotated together and continuously by means of the rotating reel.

The heat being confined to the lower portion of the circular chamber directly under the fruit and being agitated and kept in motion by the fans or blades of the rotating reel, a circulation is maintained and the heated air is forced up through the fruit, and as the latter is continuously rotated the heat is thoroughly equalized and does not pass directly up, but is, as it were, cut by the rotation and is forced through all the fruit equally.

If the whole carrier be filled at once, every tray on that carrier will be ready to be taken off at the same time and the carrier is refilled, the door closed, and the machine started up by throwing the power mechanism into action. It is allowed to rotate until another change is necessary.

In this device all the heat is controlled and utilized, resulting in an economy in fuel and labor, and the handling and turning of trays and the picking over of the fruit while evaporating are avoided, because the fruit is equally dried over the whole surface of each tray. The temperature is evenly distributed, so that the fruit dries very rapidly, and at the same time the sirup is not boiled out, but is retained in the fruit, thus giving from one to two pounds more of dried fruit to the bushel than is usual.

Access for a workman to arrange furnace-pipe and to oil bearings may be had to the interior of the shell and of the inner core through suitable manholes or doors, unnecessary herein to show, and suitable apertures $a^6$ are provided near the bottom for the entrance of the cold air.

Having thus described my invention, what I claim as new, and desire to secure by Letters Patent, is—

1. An evaporator, consisting of an outer shell, an inner wall concentric therewith and forming an annular space within the outer shell, a source of heat communicating with the lower portion of said space, a rotating frame within the upper portion of said space and a tray carrier mounted upon said frame and independently rotatable or adjustable thereon.

2. An evaporator consisting of an outer shell, an inner wall concentric therewith and forming an annular space within the outer shell, a source of heat communicating with the lower portion of said space, a rotatable frame in the upper portion of said space, blades or fans extending downwardly from said frame, and a tray carrier mounted upon said frame and independently rotatable or adjustable thereon.

3. An evaporator, consisting of an outer shell, an inner core concentric with the outer shell and rising from its base, a rotatable drum on top of said core, said drum and core forming with the outer shell an annular space, a source of heat communicating with the lower portion of said space, an encircling reel or frame-work carried by the rotatable drum in the upper portion of the annular space, and a tray carrier mounted upon said reel and independently rotatable or adjustable thereon.

4. An evaporator, consisting of an outer shell, an inner core concentric with the outer shell and rising from its base, a rotatable drum on top of said inner core, said drum and core forming with the outer shell an annular space, a source of heat communicating with the lower portion of said space, an encircling reel or frame-work carried by the rotatable drum in the upper portion of the annular space, a tray carrier mounted upon said reel and independently rotatable or adjustable thereon, and means for rotating the drum and reel consisting of the circular ring of the reel and the endless power chain passing into the annular space and engaging with said ring.

5. An evaporator consisting of an outer shell, an inner wall concentric with the outer shell and forming with the outer shell an annular space, a source of heat communicating with the lower portion of said space, a rotating frame-work in the upper portion of the annular space, circular tracks carried by said frame-work, and a tray-carrier mounted upon said tracks and independently rotatable or adjustable thereon.

6. An evaporator consisting of an outer shell having an inner concentric core, a central rotatable shaft having an encircling drum which, with the inner core, forms an annular chamber within the outer shell, radial arms extending from the central shaft, and carrying rollers mounted upon a fixed track in the outer shell, upright frames carried by said arms, tracks carried by the frames, tray-carriers mounted and independently rotatable upon said tracks, and a source of heat communicating with the lower portion of the annular space.

In witness whereof I have hereunto set my hand.

JEREMIAH WELLINGTON MOTE.

Witnesses:
L. F. LANE,
IRA B. RIDDLE.